US008184660B2

(12) United States Patent
Soroushian et al.

(10) Patent No.: US 8,184,660 B2
(45) Date of Patent: May 22, 2012

(54) TRANSPARENT METHODS FOR ALTERING THE VIDEO DECODER FRAME-RATE IN A FIXED-FRAME-RATE AUDIO-VIDEO MULTIPLEX STRUCTURE

(75) Inventors: Kourosh Soroushian, San Jose, CA (US); Aaron G. Wells, Piedmont, CA (US); Gregory R. Maertens, Milan (IT)

(73) Assignee: LSI Corporation, Milpitas, CA (US)

( * ) Notice: Subject to any disclaimer, the term of this patent is extended or adjusted under 35 U.S.C. 154(b) by 1250 days.

(21) Appl. No.: 11/227,789

(22) Filed: Sep. 15, 2005

(65) Prior Publication Data

US 2007/0058684 A1     Mar. 15, 2007

(51) Int. Cl.
*H04J 3/24*   (2006.01)
*H04J 3/06*   (2006.01)
*H04N 7/12*   (2006.01)
*H04N 7/01*   (2006.01)

(52) U.S. Cl. ..... 370/473; 370/509; 370/535; 348/390.1; 348/441; 375/240.01; 375/240.12; 375/240.28

(58) Field of Classification Search ............. 370/395.64, 370/468, 473, 509, 532, 535, 537, 539–543, 370/545; 709/232, 233, 236, 237; 348/385.1, 348/387.1, 390.1, 441, 443, 445–446, 454–456, 348/459; 375/240.01, 240.12, 240.28
See application file for complete search history.

(56) References Cited

U.S. PATENT DOCUMENTS

| 5,841,470 | A  | * | 11/1998 | Welsh ........................ 375/240.1 |
| 6,041,142 | A  | * | 3/2000  | Rao et al. ...................... 382/232 |
| 6,167,088 | A  | * | 12/2000 | Sethuraman ............... 375/240.1 |
| 6,324,217 | B1 | * | 11/2001 | Gordon .................... 375/240.28 |
| 6,441,813 | B1 | * | 8/2002  | Ishibashi ....................... 345/213 |
| 6,469,744 | B1 | * | 10/2002 | Pearlstein ..................... 348/554 |
| 6,671,323 | B1 | * | 12/2003 | Tahara et al. ............ 375/240.26 |
| 7,215,710 | B2 | * | 5/2007  | Yamada et al. .......... 375/240.24 |
| 7,460,182 | B2 | * | 12/2008 | Takahashi ..................... 348/714 |
| 2002/0009148 | A1 | * | 1/2002 | Nishio .................... 375/240.25 |
| 2002/0035724 | A1 | * | 3/2002 | Wise ................................ 725/1 |
| 2004/0151479 | A1 | * | 8/2004 | Ogikubo ....................... 386/117 |
| 2006/0077295 | A1 | * | 4/2006 | Wyman ......................... 348/459 |

* cited by examiner

*Primary Examiner* — Kwang B Yao
*Assistant Examiner* — Redentor Pasia
(74) *Attorney, Agent, or Firm* — Christopher P. Maiorana, PC

(57) ABSTRACT

An apparatus comprising a first circuit and a second circuit. The first circuit may be configured to generate a multiplexed signal at a fixed frame-rate in response to a video input signal. The multiplexed signal comprises one of (i) a pre-defined packet which corresponds to a new frame rate detected on the video input signal when in a first mode (ii) repeated video frames at the fixed frame-rate when in a second mode and (iii) augmented digitally repeated frames at the fixed-rate when in a third mode. The second circuit may be configured to generate a video output signal in response to decoding (i) the multiplexed signal at the new frame rate defined by the pre-defined packet when in the first mode or (ii) the repeated video frames on the multiplexed signal at the fixed frame-rate when in the second mode.

14 Claims, 5 Drawing Sheets

TRANSPARENT METHODS FOR ALTERING THE VIDEO DECODER FRAME-RATE IN A FIXED-FRAME-RATE AUDIO-VIDEO MULTIPLEX STRUCTURE

FIELD OF THE INVENTION

The present invention relates to video processing generally and, more particularly, to a transparent method for altering a video decoder frame-rate in a fixed-frame-rate audio-video multiplex structure.

BACKGROUND OF THE INVENTION

Digital video and multimedia applications are becoming common place in the everyday life. Digital still cameras, DVD players and recorders, digital satellite broadcast and High-Definition televisions all implement digital audio and video compression technology. The digital media revolution has been the product of years of research by the private sector, and a great deal of investment from public entities and organizations. A multitude of formats describing the compressed audio, video and the encapsulating multiplex have been developed.

Typically, the multiplex format is simply a specification of how the audio and video data have been interleaved, and how audio and video can be separated from each other for the purpose of decoding individual streams. A multiplex may be made of a header portion, as well as a payload section, and information for performing trick-play and indexing operations. More importantly, the multiplex may convey information related to the framework of each stream, the method for performing audio/video synchronization, the overall stream sizes and individual sample-rates, and additional information pertinent to an individual encapsulated stream. Some multiplex formats allow updates to parts or all of descriptors, while other formats need the overall stream descriptions to remain consistent for part or all of the duration of the stream multiplex.

It would be desirable to provide a method and/or apparatus for altering the video frame-rate within the confines of a fixed-frame rate multiplex, to allow for the frame-rate conversion to take place through methods that are more widely employed and accepted, such as the repeating of interspersed fields rather than the repeating of two or more consecutive fields.

SUMMARY OF THE INVENTION

The present invention concerns an apparatus comprising a first circuit and a second circuit. The first circuit may be configured to generate a multiplexed signal at a fixed-frame-rate in response to a video input signal. The multiplexed signal comprises one of (i) a pre-defined packet which corresponds to a new frame rate detected on the video input signal when in a first mode, (ii) repeated video frames at the fixed frame rate when in a second mode and (iii) augmented digitally repeated frames at the fixed rate when in a third mode. The second circuit may be configured to generate a video output signal in response to decoding (i) the multiplexed signal at the new frame rate defined by the pre-defined packet when in the first mode or (ii) the repeated video frames on the multiplexed signal at the fixed frame rate when in the second mode.

The objects, features and advantages of the present invention include providing a method and/or apparatus that may (i) allow a decoder to decode video and/or audio data at different frame rates while allowing an audio-video multiplexer structure to transmit data at a fixed frame-rate and/or (ii) lead to improved video quality on non-progressive television monitors.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
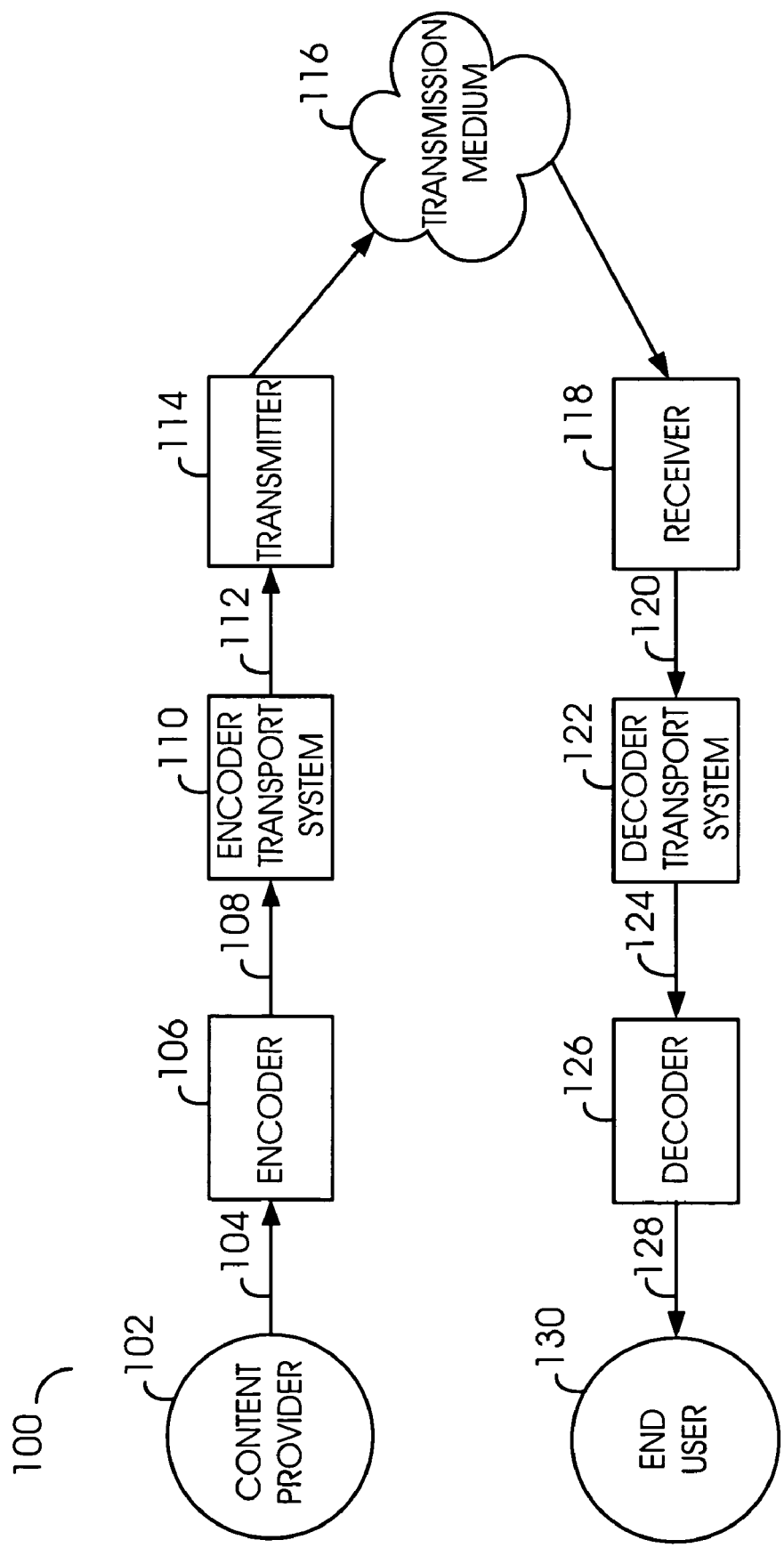
FIG. 1 is a block diagram illustrating various components of a compressed video system in accordance with a preferred embodiment of the present invention.

Referring to FIG. 1, a block diagram of a system 100 in accordance with a preferred embodiment of the present invention is shown. In general, a content provider 102 presents video image, audio or other data to be compressed and transmitted in a data stream 104 to an input of an encoder system 106. The encoder system 106 may be implemented in accordance with a preferred embodiment of the present invention. The video image may be comprise a variable-rate source. The encoder system 106 may be configured to generate a compressed bit stream 108 in response to the data stream 104. In one example, the encoder system 106 may be configured to encode the data stream 104 according to one or more encoding (or compression) standards (e.g., MPEG-1, MPEG-2, MPEG-4, WMV, VC-9, VC-1, H.262, H.263, H.264, H.264/JVC/AVC/MPEG-4 part 10, AVS 1.0, REALNETWORKS, DIVX NETWORKS, and any other open or proprietary methods for compression of audio-video data). The encoder system 106 may be further configured to embed, tunnel and/or otherwise communicate a pre-defined packet in the bit stream 108. The pre-defined packet may signal the start of a frame rate change and specify a new frame-rate. In general, the bit stream 108 (or fixed frame-rate multiplex) may comprise a pre-defined packet or encoded elementary data stream. The fixed frame-rate multiplex may be in the form of an Audio Video Interleave (AVI) file format. The pre-defined packet and the elementary data stream will be discussed in more detail in connection with FIG. 4.

The compressed bit stream 108 from the encoder system 106 may be presented to an encoder transport system 110. An output of the encoder transport system 110 generally presents a signal 112 to a transmitter 114. The transmitter 114 transmits the compressed data via a transmission medium 116. In one example, the content provider 102 may comprise a video broadcast, DVD, or any other source of video data stream. The transmission medium 116 may comprise, for example, a broadcast, cable, satellite, or data network, a DVD, a hard drive, or any other medium implemented to carry, transfer, and/or store a compressed bit stream.

On a receiving side of the system 100, a receiver 118 may be configured to receive a compressed signal from the transmission medium 116. The receiver 118 generally presents an encoded bit stream 120 to a decoder transport system 122. The decoder transport system 122 generally presents the encoded bit stream via a link 124 to a decoder system 126. The decoder system 126 may be implemented as a separate system in accordance with one embodiment of the present invention. The decoder system 126 generally decompresses (decodes) the data bit stream and presents the data via a link 128 to an end user hardware block (or circuit) 130. The decoder system 126 may search for the pre-defined packet or the elementary data stream on the signal 124. The decoder system 126 may also change an internal frame rate in accordance with the frame rate information as defined by the pre-defined packet.

The present invention may address specific problems of using a fixed frame-rate multiplex to carry variable frame-rate video content. Generally, the fixed frame-rate multiplex may be observed in compressed standards such as MPEG-1 or MPEG-4 which do not implicitly have support for repeat (3:2) field signaling. The fixed frame-rate multiplex may also be observed (i) in standards where the use of repeat (3:2) field signaling is purposefully disabled or (ii) in a fixed frame-rate file multiplex such as an Audio Video Interleave (AVI) file format. Without the present invention, such fixed frame-rate file multiplex systems do not include support for a variable-frame-rate video elementary stream.

Figure 2:
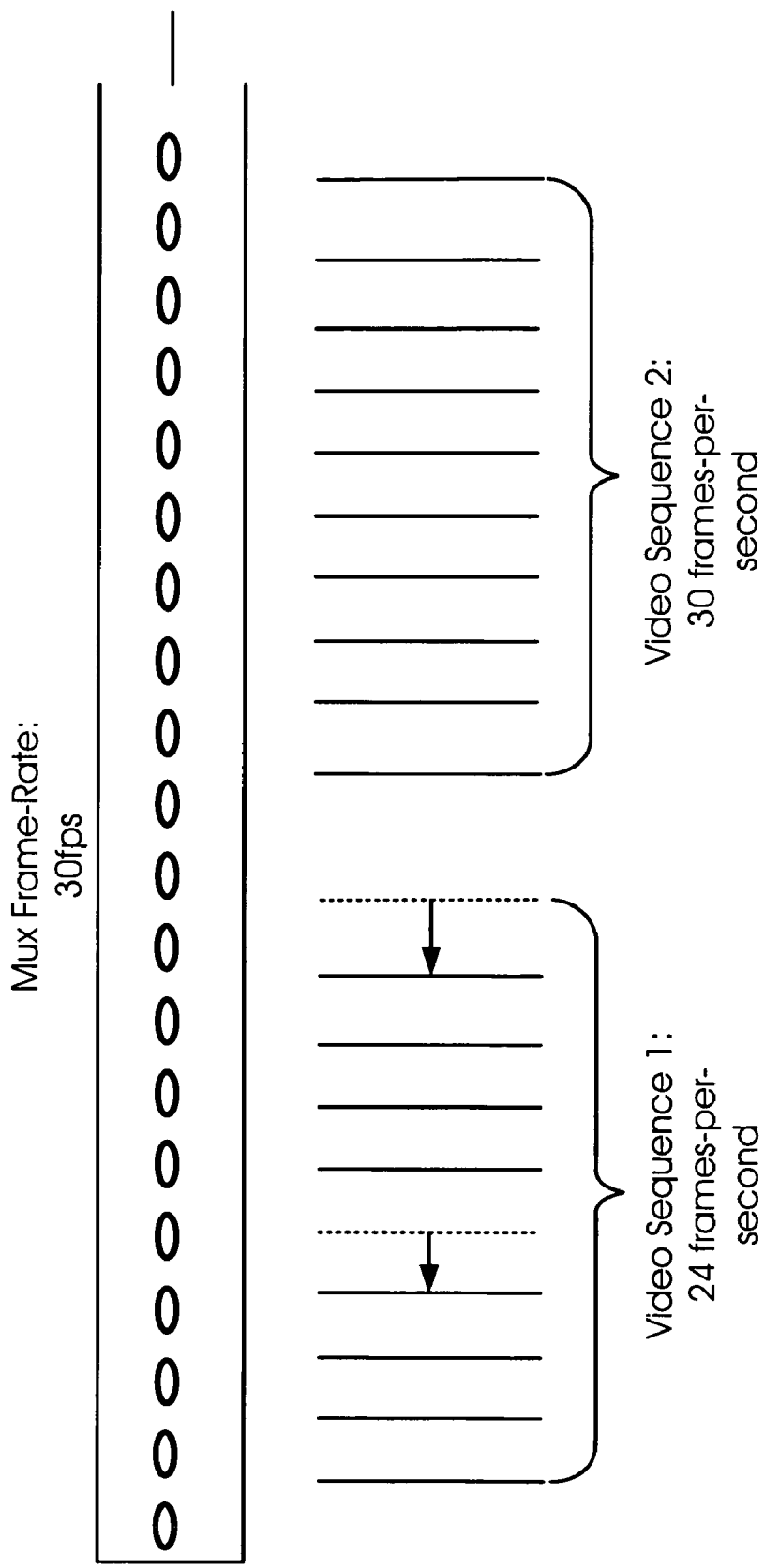
FIG. 2 is a diagram illustrating various video sequences being transmitted at different frame rates.

Referring to FIG. 2, a diagram illustrating various video sequence being transmitted at different frame rates is shown. The original video signal 104 may comprise a variable-rate source, which is generally the case for broadcast television where movies shot at 24 frames-per-second are intermixed with video broadcast shot at 60 fields (30 frames) per second. To achieve the best quality, the fixed frame-rate multiplex may be implemented to include (i) the largest frame-rate of the encapsulated streams and (ii) all video sequences encoded at the multiplex frame-rate. In such a case, all video content of a lower frame-rate than the maximum would have to undergo some form of a frame-duplication process in order to match the overall multiplex rate. Such frame duplication may be completed either through (i) the use of special flags in the video elementary-stream standard, (ii) encoding the same frame twice, or (iii) creating a digital duplicate using the least possible amount of information needed to represent the repeated frame. Several alternatives exist for the presentation of the video signal in cases where an entire frame of video is repeated.

Figure 3:
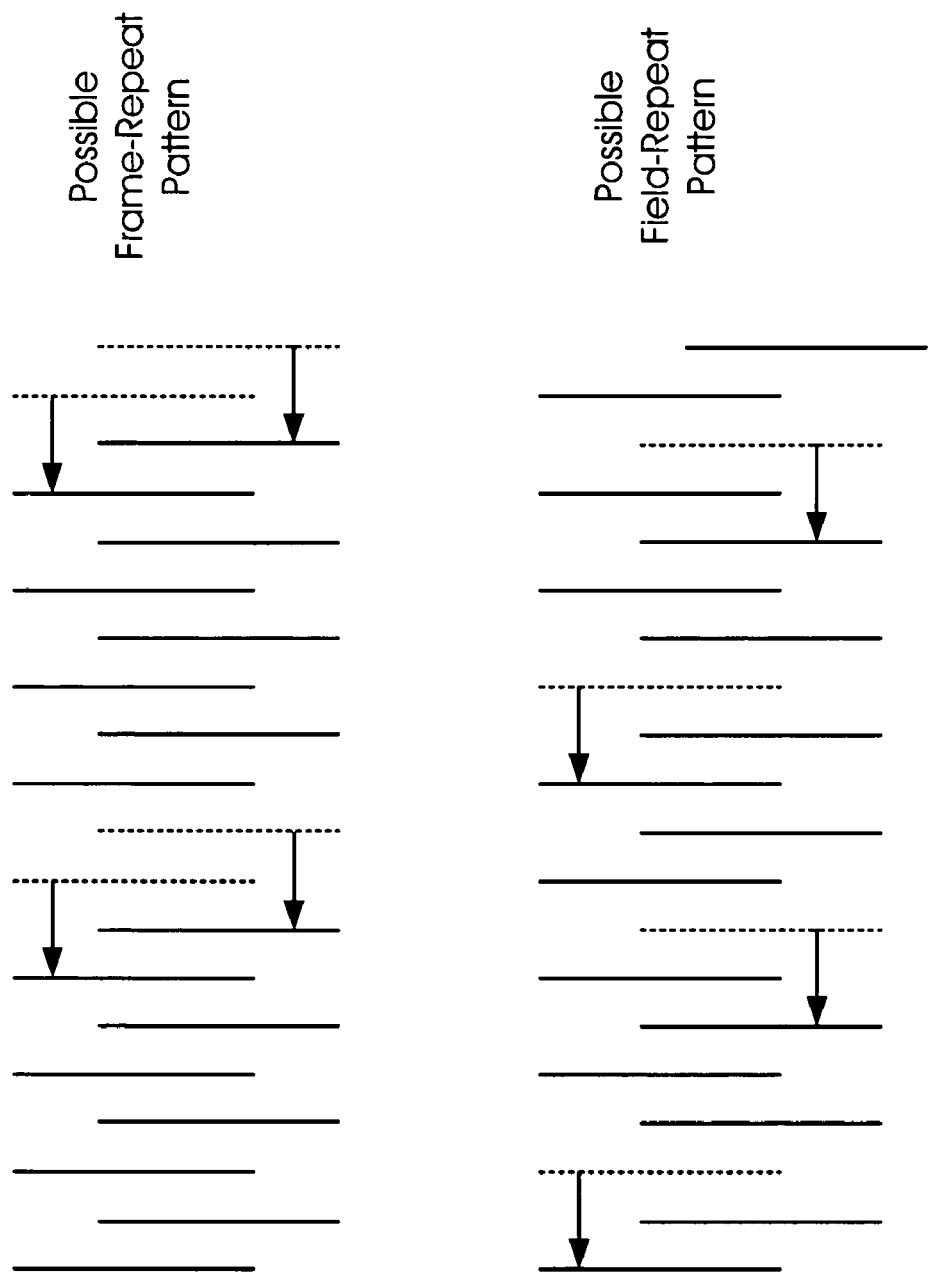
FIG. 3 is a diagram illustrating a frame-repeat pattern and a field-repeat pattern.

Referring to FIG. 3, a diagram illustrating a frame-repeat pattern and a field-repeat pattern is shown. Rather than presenting the entire frame of video (which normally comprises 2 distinct fields), the same display rate may be achieved by repeating individual fields which are dispersed in time and do not necessarily use the same frame. The field-repeat pattern may be preferred over the frame-repeat pattern. The present invention may augment the fixed frame-rate stream prior to encoding the original video or audio data to allow the decoder system 126 to present the decoded video or audio output 128 via a possible field-repeat-pattern scheme. With the field-repeat pattern, better visual results on a standard interlaced television monitor may be achieved. The field repeat pattern is generally widely used in the process of frame-rate conversion and the visual field of observers have been accustomed to the side-effects of the field repeat pattern.

Figure 4:
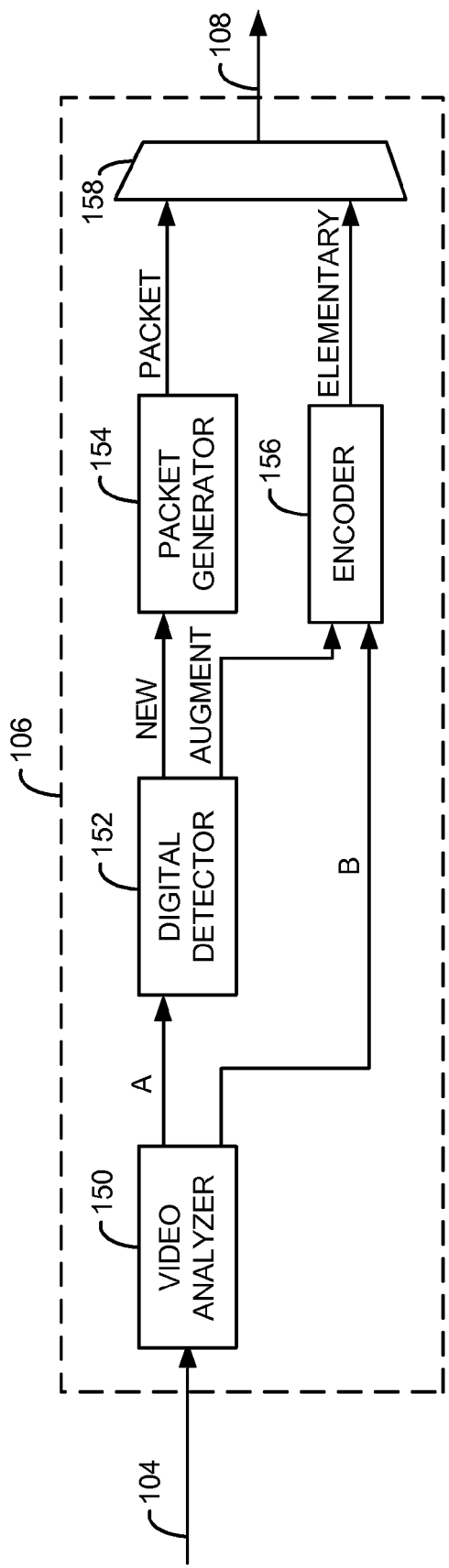
FIG. 4 is a more detailed block diagram illustrating an example encoder in accordance with a preferred embodiment of the present invention.

Referring to FIG. 4, a detailed block diagram illustrating an example encoder system is shown. The encoder system 106 generally comprises a block (or circuit) 150, a block (or circuit) 152, a block (or circuit) 154, a block (or circuit) 156, and a block (or circuit) 158. The block 150 may be implemented as a video analyzer, the block 152 may be implemented as a digital detection circuit. The block 154 may be implemented as a packet generator. The block 156 may be implemented as an encoder. The block 158 may be implemented as a multiplexer. The video analyzer 150 may receive the data stream 104. The video analyzer 150 may present a signal (e.g., A) to the digital detector 152. The video analyzer may present a signal (e.g., B) to the encoder 156. The digital detector 152 may present a signal (e.g., NEW) to the packet generator 154. The digital detector 152 may present a signal (e.g., AUGMENT) to the encoder 156. The packet generator 154 may present a signal (e.g., PACKET) to the multiplexer 158. The encoder 156 may present a signal (e.g., ELEMENTARY) to the multiplexer 158. The multiplexer 158 may present the compressed video stream 108.

The video analyzer 150 may detect repeated frames during an analysis phase on the incoming video sequence 104. The video analyzer 150 may determine whether a change in the frame-rate of the incoming video sequence has occurred. If the video analyzer 150 detects repeated frames, the video analyzer 150 may present the incoming video data with repeated frames on the signal B to the encoder 106. The video analyzer 150 may present video data which does not include repeated frames on the signal A to the digital detector 152. The video analyzer 150 may determine whether a change on the frame rate has occurred through the collection of statistics of an adequate number of video frames.

The digital detector 152 may determine whether the incoming video data on the signal A includes digitally repeated data. The digital detector 152 may also determine whether the digitally repeated data includes a new frame rate. If digitally repeated data is detected with a new frame rate, the digital detector 150 may specify the new-frame rate on the signal NEW. The packet generator 154 may insert a pre-defined packet on the signal PACKET in response to receiving the new-frame rate on the signal NEW. The pre-defined packet generally provides the new-frame rate information. The packet generator 154 may present the signal NEW (including the pre-defined packet) to the multiplexer 158. The pre-defined packet on the signal PACKET may be multiplexed with encoded data on the signal ELEMENTARY. Generally, the pre-defined packet may signal the start of a frame-rate change, and specify the new frame rate.

The encoder 156 may encode the incoming video data with repeated frames on the signal B to produce the compressed elementary bit stream on the signal ELEMENTARY. Non-repeated frames may be presented to the encoder 156 for encoding on either the signal B or the signal AUGMENT. If the digital detector 152 determines that a new frame rate is not present on the signal A, the digital detector 152 may augment all of the digitally repeated frames via a pre-defined pattern in a video elementary-stream portion of the stream 108. The pre-defined pattern in the video elementary-stream portion may be designed to carry proprietary information (e.g., an MPEG USER-DATA field). The digital detector 152 may present the augmented digitally repeated frames via the field-repeat pattern on the signal AUGMENT to the encoder 156. In one example, the digitally repeated frames may be augmented during the encoding process to allow decoders that are not familiar with the present invention to present the overall encapsulated audio and video streams at the correct frame-rate. Decoders that are compatible with the present invention may be able to alter the presentation frame-rate of the overall encapsulated audio and video streams at the correct frame rate.

The repeated frames may be encoded by the encoder 156 via two possible methods (i) as a normal frame that is a duplicate of the previously captured image (e.g., the encoding of data with repeated frames on the signal B) and (ii) as a digital replicate of the previous frame (which include augmented digitally repeated frames), where all the elements of the frame are encoded via direct references to the previously encoded image. The encoder system 106 may maintain the newly selected frame rate, until a new change in the frame rate is detected. After a new change in the frame rate is detected, the encoder system 106 may insert the pre-defined packet in the fixed frame-rate multiplexer 158, signaling the start of a frame-rate change while the encoder system 106 continues to encode the incoming video at the fixed frame-rate. Throughout the encoding process, the encoder system 106 may encode the incoming video sequence at a fixed rate which may be defined by the file format or other similar forms of stream encapsulation.

In a first mode, the encoder system 106 may present the pre-defined packet on the bitstream 108 in response to the digital detector 152 detecting a new frame rate. In a second mode, the encoder system 106 may present encoded repeated video frames at a fixed frame-rate on the bitstream 108 in response to the video analyzer 150 detecting repeated video frames. In a third mode, the encoder system 106 may present augmented digitally repeated frames on the bitstream 108 in response to the digital detector 152 detecting digitally repeated frames at a fixed frame-rate. In a fourth mode, the encoder system 106 may present encoded non-repeated frames on the bitstream if the video input signal 107 does not include repeated frames.

Figure 5:
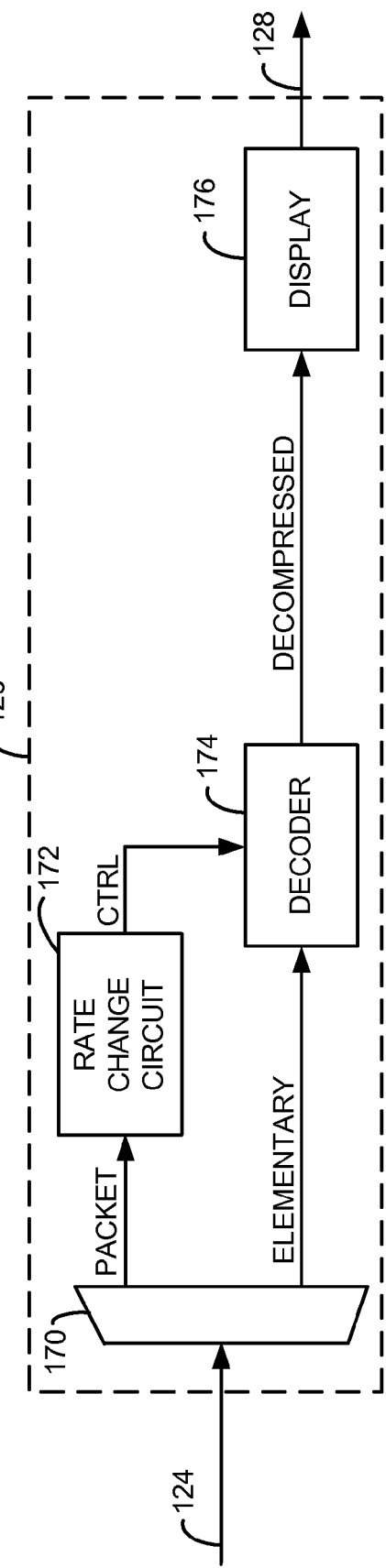
FIG. 5 is a more detailed block diagram illustrating an example decoder in accordance with a preferred embodiment of the present invention.

Referring to FIG. 5, the decoder system 126 generally comprises a block (or circuit) 170, a block (or circuit) 172, a block (or circuit) 174, and a block (or circuit) 176. The block 170 may be implemented as a demultiplexer. The block 172 may be implemented as a rate change circuit. The block 174 may be implemented as a decoder. The block 176 may be implemented as a display. The demultiplexer 170 may present the pre-defined packet on the signal PACKET to the rate change circuit 172. The demultiplexer 170 may present compressed elementary bit stream on the signal ELEMENTARY to the decoder 174. The rate change circuit 172 may present a control signal (e.g., CTRL) to the decoder 174. The decoder 174 may present decoded video on a signal (e.g., DECOMPRESSED) to the display 176. The display may present video output 178 to an end user.

The decoder system 126 may be aware of (i) the definition of the pre-defined information on the signal PACKET and/or (ii) any augmented digitally repeated information on the signal ELEMENTARY. In general, the rate change circuit 172 may understand syntax of the pre-defined packet on the signal PACKET, and search for the syntax of the pre-defined packet during the demultiplexing process. Once the pre-defined packet has been received by the rate change circuit 172, the rate change circuit 172 may present the signal CTRL to the decoder 174 which may change the internal frame-rate accordingly. While decoding the video elementary stream on the signal ELEMENTARY, the decoder 174 may search for any video frames which have been augmented by the pre-defined pattern. Such augmented frames signify digitally repeated frames at a fixed frame-rate. The decoder 174 may eliminate the augmented frames completely. The decoder 174 may display all of the available frames, except for the digitally repeated frames. The decoder 174 may employ a normal frame-rate conversion program at a display rate generally defined by a video output system. Alternatively, a decoder which is unaware of the pre-defined packet and/or the augmented digitally repeated frames in the bit stream 108 may decode the video stream normally. Such a decoder normally presents the frames in the order the frames were received in the elementary stream.

Figure 6:
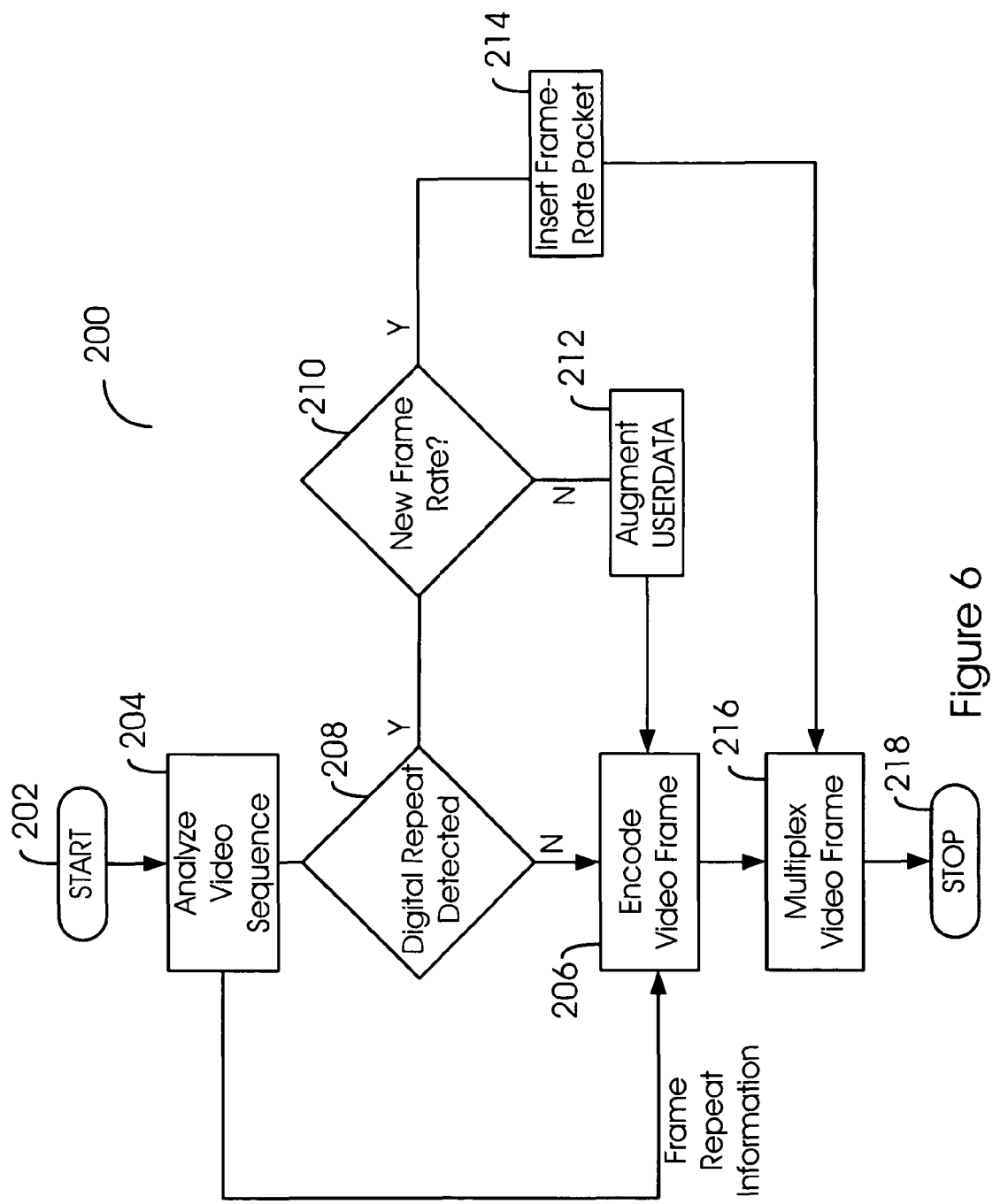
FIG. 6 is a flow diagram illustrating a preferred embodiment of the present invention.

Referring to FIG. 6, a method 200 illustrating the operation of the present invention is shown. The method 200 generally comprises a state (or step) 202, a state (or step) 204, a state (or step) 206, a decision state (or step) 208, a decision state (or step) 210, a state (or step) 212, a state (or step) 214, a state (or step) 216 and a state (or step) 218. The state 204 generally analyzes the video sequence. The video analyzer 150 may determine whether the incoming video sequence 104 includes frame repeat information. If the incoming video sequence includes frame repeat information, the method 200 moves to the step 206. The state 206 generally encodes the video frame (or the frame repeat information). If the incoming video sequence 104 does not include frame repeat information, the method 200 moves to the decision state 208. The decision state 208 determines if there is a digital replicate of the previous frame. If a digital replicate of the previous frame is not present on the incoming video sequence 104, the method 200 moves to the step 206. The state 206 may encode the video frame (or the frame repeat information). If there is a digital replicate of the previous frame, the method 200 moves to the decision state 210. The decision state 210 generally determines whether a new frame rate is present in the digital replicate of the previous frame. If a new frame rate is present, the method 200 moves to the state 214. The state 214 generally inserts a pre-defined packet. The state 216 generally multiplexes the video frame between the pre-defined packet or the encoded frame repeat information. If a new frame rate is not present, the method 200 moves to the state 212. The state 212 may augment all repeated frames detected on the digital replicate of the previous frame via the pre-defined pattern in a video elementary-stream portion of the incoming video sequence 104. The video elementary stream portion of the stream may be configured to carry proprietary information (e.g., such as the MPEG USED_DATA field).

The function performed by the flow diagram of FIG. 6 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICS, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMS, RAMS, EPROMs, EEPROMs, Flash memory, magnetic or optical cards, or any type of media suitable for storing information.

While the invention has been particularly shown and described with reference to the preferred embodiments thereof, it will be understood by those skilled in the art that various changes in form and details may be made without departing from the spirit and scope of the invention.

The invention claimed is:

1. An system comprising:
a first circuit configured to generate a multiplexed signal in response to a video input signal, said video input signal comprising a plurality of video frames, wherein (i) a first sequence of said video input signal operates at a first frame rate, and (ii) a second sequence of said video input signal operates at a second frame rate; said multiplexed signal comprises
   (a) a pre-defined packet which specifies a new frame rate corresponding to either (i) said first frame rate or (ii) said second frame rate, and
   (b) repeated video frames encoded as a digital duplicate of a previous frame;
wherein the first circuit comprises a digital detector configured to detect digitally repeated frames and augments said digitally repeated frames into augmented digitally repeated frames;
if the digital detector detects the digitally repeated frames, said multiplexed signal comprises
   (c) the pre-defined packet which specifies said new frame rate corresponding to either (i) said first frame rate or (ii) said second frame rate, and
   (d) said augmented digitally repeated frames arranged in a field repeat pattern scheme if said video input signal comprises (i) only said first frame rate or (ii) only said second frame rate; and
a second circuit configured to generate a video output signal in response to decoding said multiplexed signal.

2. The system according to claim 1, wherein said first circuit further comprises:
a video analyzer configured to determine whether said video input signal includes the repeated video frames.

3. The system according to claim 1, wherein said digital detector is further configured detect said new frame rate on said video input signal.

4. The system according to claim 3, wherein said first circuit further comprises:
a packet generator configured to produce said pre-defined packet which corresponds to said new frame rate on said video input signal.

5. The apparatus system according to claim 4, wherein said first circuit further comprises:
an encoder configured to encode (i) said repeated video frames at said new frame-rate, (ii) said augmented digitally repeated frames at said new frame-rate and (iii) non-repeated frames at said new frame-rate.

6. The apparatus system according to claim 5, wherein said first circuit further comprises:
a multiplexer coupled to said packet generator and said encoder to produce said multiplexed signal.

7. The system according to claim 1, wherein said multiplexed signal further comprises:
non-repeated frames at said new frame-rate.

8. A method for altering an internal frame-rate of a video decoder, comprising the steps of:
generating a multiplexed signal in response to a video input signal, said video input signal comprising a plurality of video frames, wherein (i) a first sequence of said video input signal operates at a first frame rate, and (ii) a second sequence of said video input signal operates at a second frame rate; said multiplexed signal comprises
   (a) a pre-defined packet which specifies a new frame rate corresponding to either (i) said first frame rate or (ii) said second frame rate, and
   (b) repeated video frames encoded as a digital replicate duplicate of a previous frame;
detecting digitally repeated frames and augmenting said digitally repeated frames into augmented digitally repeated frames;
upon detecting the digitally repeated frames, said multiplexed signal comprises
   (c) the pre-defined packet which specifies said new frame rate corresponding to either (i) said first frame rate or (ii) said second frame rate, and
   (d) said augmented digitally repeated frames arranged in a field repeat pattern scheme if said video input signal comprises (i) only said first frame rate or (ii) only said second frame rate; and
generating a video output signal in response to decoding said multiplexed signal.

9. The method according to claim 8, wherein step (A) further comprises the step of:
determining whether said video input signal includes the repeated video frames.

10. The method according to claim 8, further comprising the step of:
determining whether said digitally repeated frames includes said new frame-rate.

11. The method according to claim 10, further comprising the step of:
generating said pre-defined packet if said digitally repeated frames include said new frame-rate.

12. The method according to claim 10, further comprising the step of:
encoding one of (i) non-repeated frames at said new frame rate (ii) said repeated video frames at said new frame rate or (iii) said augmented digitally repeated frames at said new frame rate.

13. The method according to claim 10, further comprising the step of:
multiplexing (i) said pre-defined packet, (ii) said repeated video frames at said new frame-rate (iii) said augmented digitally repeated frames at said new frame-rate and (iv) non-repeated frames at said new frame-rate.

14. The method according to claim 8, further comprising the step of:
removing said augmented digitally repeated frames from said multiplex signal with a decoder.

* * * * *